United States Patent
Smith et al.

(10) Patent No.: US 8,706,736 B2
(45) Date of Patent: Apr. 22, 2014

(54) EXTENDED WIDTH ENTRIES FOR HASH TABLES

(75) Inventors: Brandon C. Smith, Los Gatos, CA (US); John J. Dull, San Jose, CA (US); Vamsi Tatapudi, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/249,793

(22) Filed: Sep. 30, 2011

(65) Prior Publication Data

US 2013/0086074 A1 Apr. 4, 2013

(51) Int. Cl.
*G06F 17/30* (2006.01)

(52) U.S. Cl.
CPC .............................. *G06F 17/30949* (2013.01)
USPC ........................................................ 707/747

(58) Field of Classification Search
CPC .............................................. G06F 17/30949
USPC ............................................................. 707/747
See application file for complete search history.

(56) References Cited

U.S. PATENT DOCUMENTS

| | | | | |
|---|---|---|---|---|
| 5,564,285 A | * | 10/1996 | Jurewicz et al. | 62/127 |
| 5,995,306 A | * | 11/1999 | Contreras et al. | 360/31 |
| 6,031,671 A | * | 2/2000 | Ayres | 360/40 |
| 6,067,547 A | * | 5/2000 | Douceur | 1/1 |
| 6,226,441 B1 | * | 5/2001 | Hartung et al. | 386/314 |
| 7,058,639 B1 | * | 6/2006 | Chatterjee et al. | 1/1 |
| 2003/0226032 A1 | * | 12/2003 | Robert | 713/200 |
| 2005/0169480 A1 | * | 8/2005 | Kuehn et al. | 380/277 |
| 2005/0283711 A1 | * | 12/2005 | Claseman | 714/759 |
| 2006/0023719 A1 | * | 2/2006 | Sindhu et al. | 370/392 |
| 2009/0259811 A1 | * | 10/2009 | Krishnan | 711/108 |
| 2011/0145188 A1 | * | 6/2011 | Vachuska | 707/610 |

* cited by examiner

*Primary Examiner* — Apu Mofiz
*Assistant Examiner* — Dara J Glasser
(74) *Attorney, Agent, or Firm* — Brinks Gilson & Lione (57) ABSTRACT

A hash table supports extended entries. The extended entries permit a base entry to extend its associated data into one or more neighboring entries. Extended entries thereby provide a mechanism through which a hash table entry may store additional data compared to a base entry. Extended entries may coexist with base entries in the hash table. The hash table thereby provides the flexibility to adapt dynamically to meet system requirements and to balance the needs of additional data storage by blending the number of extended entries (that each store more data than a base entry) and the number of base entries (each storing less data than an extended entry).

17 Claims, 9 Drawing Sheets

EXTENDED WIDTH ENTRIES FOR HASH TABLES

BACKGROUND

1. Technical Field

This disclosure relates to hash tables. In particular, this disclosure relates to hash tables with extended width entries for storing more data than a typical base entry in the hash table can store.

2. Related Art

Hash tables are widely used constructs for many different applications in which quick access to desired data is needed. Typically a hash table provides an efficient mechanism for locating the desired data based on a possibly very large key space that is mapped into only a few possible search buckets. For many implementations, hash tables are more efficient than other constructs such as search trees or table lookups, and, as a result, hash tables are used extensively in many different hardware and software applications.

Hash table entry sizes have traditionally been fixed in width to simplify the logical implementation of the hash table. However, hash tables with fixed width entries have limitations in terms of fully supporting newly developed hardware and software functionality. Such fixed width implementations are therefore rigid and difficult to adapt to evolving hardware and software requirements.

A need exists to address the problems noted above and others previously experienced with hash tables.

BRIEF DESCRIPTION OF THE DRAWINGS

The extended width entries may be better understood with reference to the following drawings and description. In the figures, like reference numerals designate corresponding parts throughout the different views.

DETAILED DESCRIPTION

Hash table entries, and the fields within the hash table entries, typically have some fixed maximum size. This presents a problem when the data that a system would like to store in a hash table entry exceeds the capacity of the hash table entry or the field in which it needs to be stored. Extended width entries allow a hash table entry to store additional specified data in the same bucket of the hash table. Extended width entries are distinct from and improve upon hash tables used in the past, including hash tables supporting flexible width entries. In order to facilitate an understanding of the distinctions between extended width entries and flexible width entries, FIG. 1 illustrates a regular entry and a flexible width entry.

Figure 1:
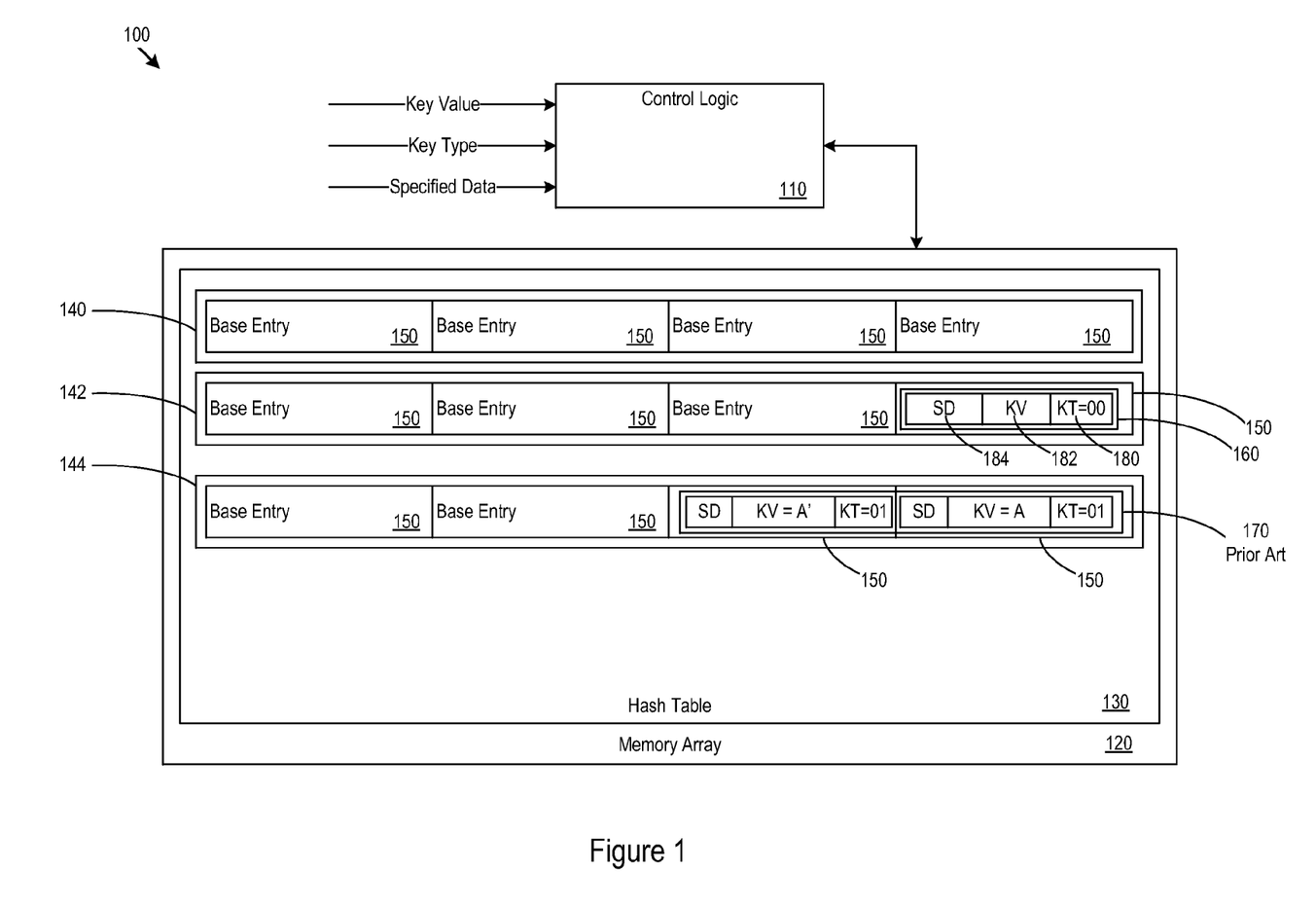
FIG. 1 illustrates a memory system.

FIG. 1 illustrates a memory system 100. The memory system 100 includes a hash table 130 implemented within a memory array 120. Control logic 110 is coupled to the memory array 120. The hash table 130 stores multiple buckets (e.g., the buckets 140, 142, 144), and the width of each bucket 140-144 may be consistent throughout the hash table 130. Each bucket 140-144 may be divided into a predetermined number of base entries 150. The base entries 150 within a bucket 140-144 may be equal in base width (e.g., 128 bits wide each). Also, the number of base entries 150 per hash table bucket may vary according to specific hash table implementations. FIG. 1 shows an example in which each bucket includes four base entries 150 with an equal base width of 105 bits. Each of buckets 140-144 therefore has a width of 420 bits. The hash table 130 also contains a regular entry 160 in a bucket 142 and a flexible width entry 170 in a bucket 144.

Each hash table entry in the hash table 130 includes a key type field (e.g., the key type field 180), a key value field (e.g., the key value field 182), and a data field to store specified data (e.g., the data field 184). Because multiple hash table entries may be stored within a hash table bucket, the key value and key type uniquely identify a particular hash table entry. When a hash table entry is inserted in the hash table 130, the key type and key value may be used by subsequent operations, such as search operations, to identify the correct hash table entry within the bucket for the operation.

The key type specifies the type and format of a hash table entry, allowing a single set of hardware resources, (e.g., a single physical hash table 130) to support multiple logically distinct hash tables and the operations performed on the logically distinct tables. The key type accomplishes this by distinguishing between different hash table entry formats. In that respect, the key type may distinguish with respect to the length of the key value field and the length of the data field. As an example, the regular entry 160 has a key type equal to 00. All hash table entries in the hash table 130 with key type 00 will have a key value and data field with the same length due to their matching entry type, namely type 00. For example, the key type 00 may identify hash table entries with a key value width of 20 bits and a data field width of 78 bits. Alternatively, the key type 01 may identify hash table entries with a key value width of 60 bits and a data field width of 38 bits.

The hash table 130 also includes a flexible width entry 170. Flexible width entries have been used when the length of a key value exceeds the maximum key value field width the system will allocate in a base entry 150. In some cases, it may even be that the desired length of the key value of the flexible width entry 170 is longer than the entire 105 bit base width of a base entry 150, and thus greater in size than the maximum key value width the system could possible allocate in a base entry 150. As a result, more than one base entry 150 is needed to store the entire entry. In such cases, the key value is split in two parts, e.g., A and A' in FIG. 1, respectively, and stored in two separate base entries of the bucket 144. The specified data and key type of flexible width entry 170 are also stored in both base entries.

However, hash tables supporting flexible width entries do not provide support for specified data of such length that it needs to be stored across multiple base entries, particularly where the length of the key value is less than the maximum system allocated width for the key value width of the multiple base entries. Instead, extended width entries provide support for storing specified data that is greater in length than the individual data fields 184 provide for in base entries.

Figure 2:
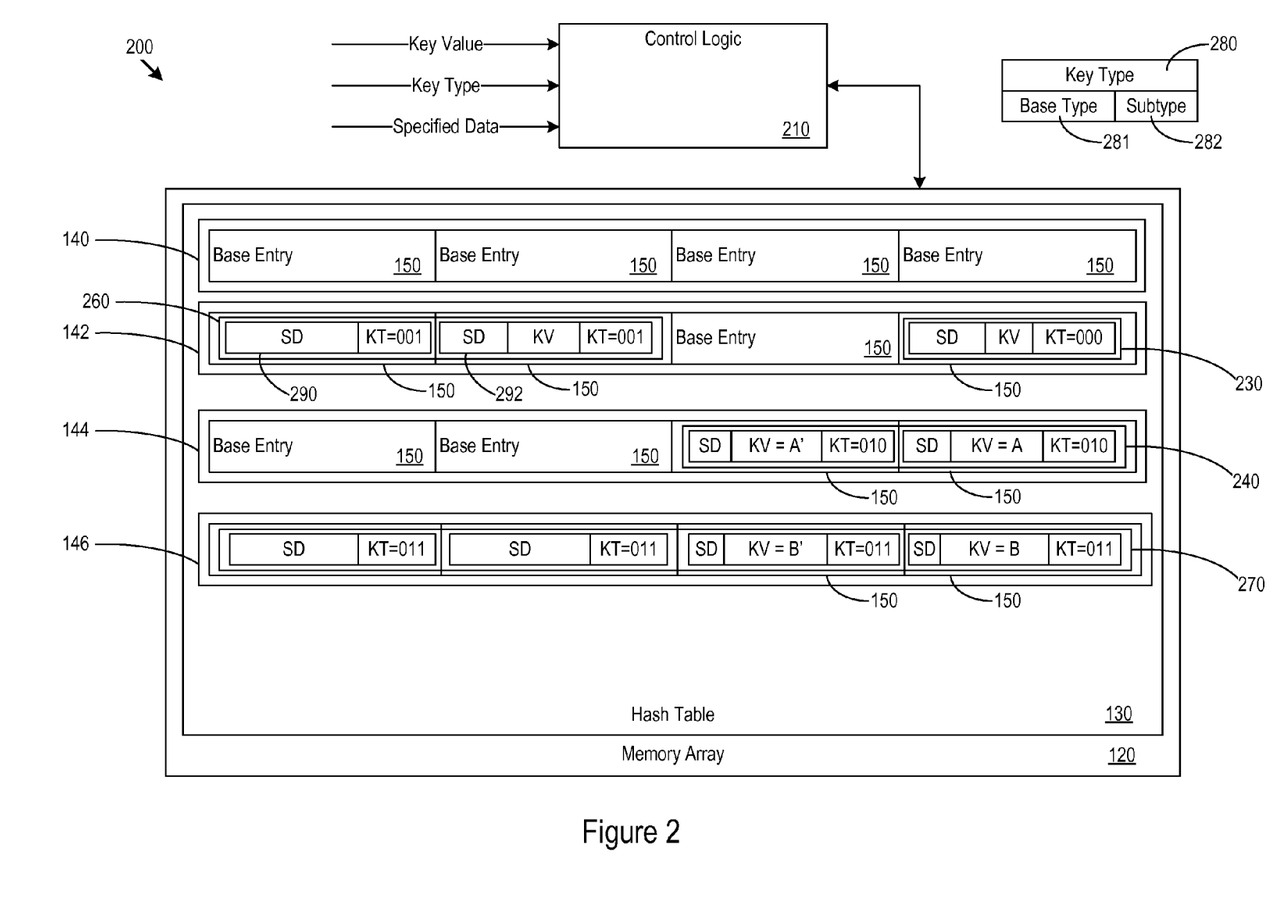
FIG. 2 illustrates a memory system supporting extended width entries.

FIG. 2 illustrates a memory system 200 supporting extended width entries. The control logic 210 performs read and write operations on the hash table 130, including extended width operations, taking as inputs the key value, key type, and specified data (and optionally other parameters). For comparison purposes, the hash table 130 includes a regular entry 230 and a flexible width entry 240. The hash table 130 also includes extended width entries, including a double extended width entry 260 and a quad extended width entry 270.

Extended entry support allows a regular entry or flexible width entry to extend its specified data into additional base entries 150 in the same bucket. An extended width entry may be formed, overall, as a combination of a non-extended portion (e.g., a regular entry or flexible width entry) and one or more extended portions (e.g., additional base entries to store specified data). The extended width entry may be employed to provide additional specified data space for any number of reasons. For example, a newer version of a software application may require additional bits of specified data to be stored in each hash table entry to support newly developed features. Extended entry support provides the flexibility to allow the hash table 130 to store either extended width or non-extended width entries for any key type.

Key types for supporting extended width entries differ from key types for flexible width entries. FIG. 2 shows an example implementation of an extended width entry key type field 280. The extended width entry key type field 280 includes two components, a base type field 281 and a subtype field 282. The base type field 281 may specify the type and format of the non-extended portion of the entry. The subtype field 282 may indicate whether the hash table entry is an extended width entry or not, with the size of the extended portion indicated by the base type of the extended width entry, by additional bits in the subtype field 282, or by other mechanisms.

For example, the controller 110 may be configured to treat every extended width entry as extended by one additional base entry only. Alternatively, the controller 110 may be configured to treat every extended width entry as extended by a number of base entries equal to the size of its non-extended portion. In more detail, each regular entry may be extended by one additional base entry, each flexible width entry spanning two base entries may be extended by two additional base entries, each flexible width entry spanning "n" base entries may be extended by "n" additional base entries, and so on.

As another example, the subtype field 282 may also specify the number additional base entries the extended-portion of the entry extends into. For instance, a subtype of 01 may indicate one additional base entry, a subtype of 10 may indicate two additional base entries, and a subtype of 11 may indicate three additional base entries. In some implementations, the subtype field 282 may specify that the extended portion of the entry extends into zero additional base entries (i.e., the entry is not actually consuming additional base entries).

Extended width entries may coexist with regular entries and flexible width entries in a single hash table 130. As noted above, extended width entries may extend either regular entries or flexible width entries. The key types of regular entries and flexible width entries may be modified (e.g., extended with an extra bit or bits) to include a subtype filed 282 and thereby support extended width entries. As shown in FIG. 2, the extended width key type field 280 has a width of three bits, in which the two most significant bits represent the base type field 281 and in which the least significant bit represents the subtype field 282. In the hash table 130, a subtype of 0 indicates that the entry is not an extended width entry. A subtype of 1 indicates that the entry is an extended width entry, and therefore capable of storing additional specified data. The subtypes of the regular entry 230 and the flexible width entry 240 each have a value of 0, specifying that (in this example) both entries are not extended width entries.

The hash table 130 also includes extended width hash table entries, such as double extended width entry 260 and quad extended width entry 270. In FIG. 2, the double extended width entry 260 has a key type of 001, and thus a base type of 00 and a subtype of 1. The base type 00 designates a particular underlying type of hash table entry, fixing the lengths of the key value field 182 and the base data field 292 of the non-extended portion in the double extended width entry 260. The base type 00 also specifies that the non-extended portion is a regular entry. The subtype 1 specifies that the regular entry is extended to form a double extended width entry 260. Accordingly, the controller 110 writes the specified data into the double extended width entry 260 using the extended data field 290 of the double extended width entry 260 as well as the base data field 292 of the double extended width entry 260. In other words, the controller 110 separates the specified data into portions SD1 and SD2, storing SD1 into the base data field 292, and storing SD2 into the extended data field 290. The controller 110 treats the complete unit of specified data as the concatenation of SD1 and SD2: {SD1, SD2}.

The double extended width entry 260 spans across two base entries in the bucket 142. Unlike the flexible width entry 240 (which also spans across two base entries), the key value of the double extended width entry 260 does not exceed the maximum key value width allocated by memory system 200 for a base entry 150. The specified data of the double extended width entry 260 is separated and stored across a first base entry and a second base entry, while the key value may be stored in the first base entry. In the memory system 200, the key type of the double extended width entry 260 is repeated in both base entries. In other implementations, the key type is not repeated in each entry, but, for example stored in the first base entry that makes up the extended width entry.

FIG. 2 also shows a quad extended width entry 270 that spans across four base entries 150 of a bucket 146. The quad extended width entry 270 has a key type of 011, and thus a base type of 01 and a subtype of 1. The base type 01 specifies the lengths of the key value field 182 and the data field 182 of the non-extended portion in the quad extended width entry 270. The base type 01 also specifies that the non-extended portion is a flexible width entry spanning two base entries. The subtype 1 specifies that the flexible width entry is extended by two base entries to form the quad extended width entry 270 as an extended width entry. Accordingly, the specified data {SD1, SD2, SD3, SD4} of the quad extended width entry 270 can be stored across the four base entries 150 included in the quad extended width entry 270. The specified data of the quad extended width entry 270 is stored across four base entries 150 even though the width of its key value is less than the maximum key value width allocated by memory system 200 for two base entries. In the memory system 200, the key type is repeated in all four base entries of the quad extended width entry 270, but in other implementations the key type need not be repeated.

In some implementations, the hash table may support packet routing, with the specified data providing information about how to forward packets to a next hop destination. In such implementations, when a packet arrives, the processing logic extracts preselected data fields from the packet to form a key value and determine a key type. The packets may adhere to any network protocol, and several examples are given below in Table: Protocols, along with an example key value width.

| Table Protocols | |
|---|---|
| Protocol | Key Value Width (bits) |
| MPLS | 20 |
| L2 MAC/VLAN | 60 |
| IP V6 Multicast | 268 |
| IP V6 Unicast | 140 |
| IP V4 Multicast | 76 |
| IP V4 Unicast | 44 |

In operation, the control logic 210 receives a key type, a key value, and specified data as inputs. Alternatively, the control logic 210 may receive the packet, and determine the key type, key value, and specified data. The control logic 210 applies the key value and key type to a hash function, generating a hash value output. Applying the key value and the key type ensure that the regular entry and the extended entry occupy the same hash bucket. The generated hash value points to the address of the specific bucket within the hash table 130 for use in hash table operations. An insert operation may use key type, key value, and the specified data to insert. Lookup and delete operations may use key type and key value as inputs. The control logic 210 may compare determined key type and key value with the key type and key value of each base entry 150 in the bucket 140-146 addressed by the generated hash value to determine whether there is a hash table "hit." When the control logic 210 performs a lookup or delete operation on flexible width and extended width hash table entries (that span multiple base entries), the control logic 210 may search against the concatenated key value (e.g., {B, B'} or {A, A'} to find hits). If no hash table entries in the specified bucket match the determined key type and key value, then the control logic 210 decides that there is a hash table "miss."

Figure 3:
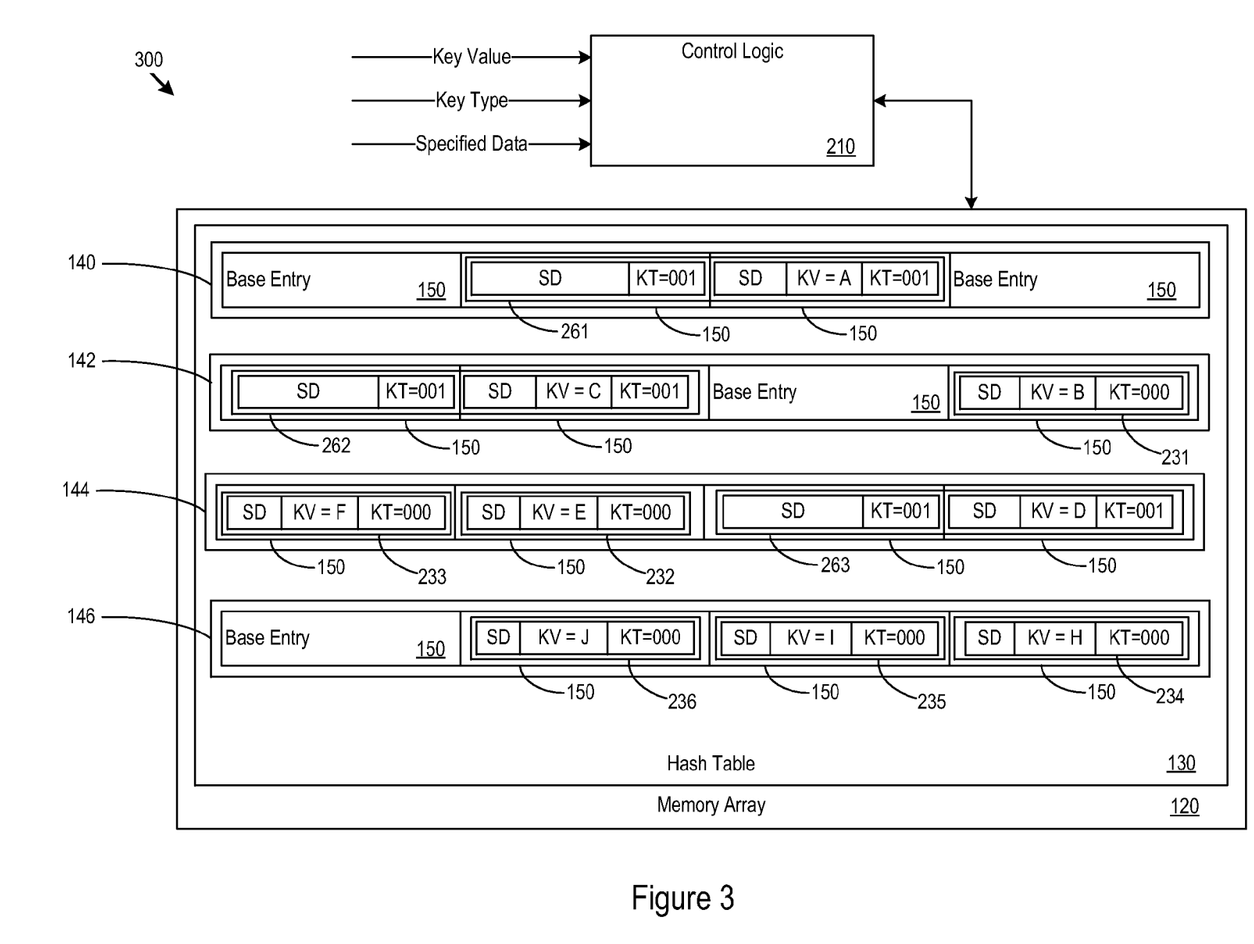
FIG. 3 illustrates a memory system supporting extended width entries.

As noted above, hash tables with extended entry support may insert and store entries as either extended width entries or non-extended entries. FIG. 3 illustrates a memory system 300 supporting extended with entries, and shows several additional examples. The hash table 130 includes multiple regular entries (e.g., 231-236) and multiple extended width entries (e.g., 261-263). The hash table 130 includes buckets storing only regular entries (e.g., 146), buckets storing only extended width entries (e.g., 140), and buckets storing both (e.g., 142, 144).

Extended entry support may provide the option to define multiple versions of specified data for each key value (e.g., an extended versions and a non-extended version). In the memory system 300, each hash table entry has the same base type of 00. Both extended and non-extended hash table entries of base type 00 exist in hash table 130. For a particular base type, a hash table 130 may contain 50% extended width entries and 50% non-extended width entries. Alternate ratios may be set and enforced by the control logic 210 (which may read such ratios out of a control or parameter memory), including 100% extended width entries or 100% non-extended width entries. The higher the percentage of non-extended width entries, the greater the number of hash table entries that can be stored in the hash table 130. For example, software applications requiring relatively smaller specified data widths may set a 100% non-extended width entry ratio to increase the number of total entries that can be stored within the hash table 130. On the other hand, the greater the percentage of extended width entries, the fewer the number of total entries the hash table 130 can store. For software applications that require additional bits of data in each hash table entry to support increased functionality, a higher ratio of extended width entries may be set at the cost of storing fewer total entries in the hash table 130. Additionally, a hash table 130 with extended width entries may flexibly allow different users to execute different versions of the same software application depending on their preferences or needs.

There is no need to preset the ratio of any particular type of entry in the hash table 130. Instead, whether a hash table entry is an extended or non-extended entry may be specified "on the fly" when the control logic 210 inserts the entry into the hash table 130. The control logic 210 may accomplish this distinction by assigning the appropriate subtype to the inserted hash table entry. Both the non-extended and extended versions of a hash table entry (having identical keys) may occupy the same hash bucket. Preferably, to ensure that all versions of a particular hash table entry occupy the same hash bucket, a consistent hash value is generated. Regardless of extended or non-extended version (i.e., regardless of subtype), the non-extended version's key type may be provided to the hash function to generate a consistent hash value.

The control logic 210 may be configured to return any version (e.g., extended or non-extended) of a hash table entry during a lookup operation. This may be referred to as a non-exact (version) search or match. To obtain a hit on both extended width and non-extended width versions of a particular key value, the control logic 210 may mask out the subtype field during key type compares. In such implementations, a lookup operation compares the base type field 281 of the key type field 280 for each hash table entry in an addressed bucket.

For example, in FIG. 3, a lookup for a key value of "C" and key type "000" may be requested of the control logic 210. The hash value generated would point to bucket 142. The non-exact search would compare "C" and the base type field "00" with each entry in the addressed bucket 142, returning the extended width entry 262. Similarly, a non-exact search for a key value of "H" would compare the searched key value and the base type field of "00" with entries in the addressed bucket 146. This non-exact search would return the regular entry 234.

Alternatively, the control logic 210 may support exact searching or matching of key types. In this case, the control logic 210 would not mask the subtype field during key type compares. In this example, an exact lookup for a key type of "A" and a key type of "000" in the hash table 130 would miss. An exact key type match may also be employed for delete and insert operations.

Figure 4:
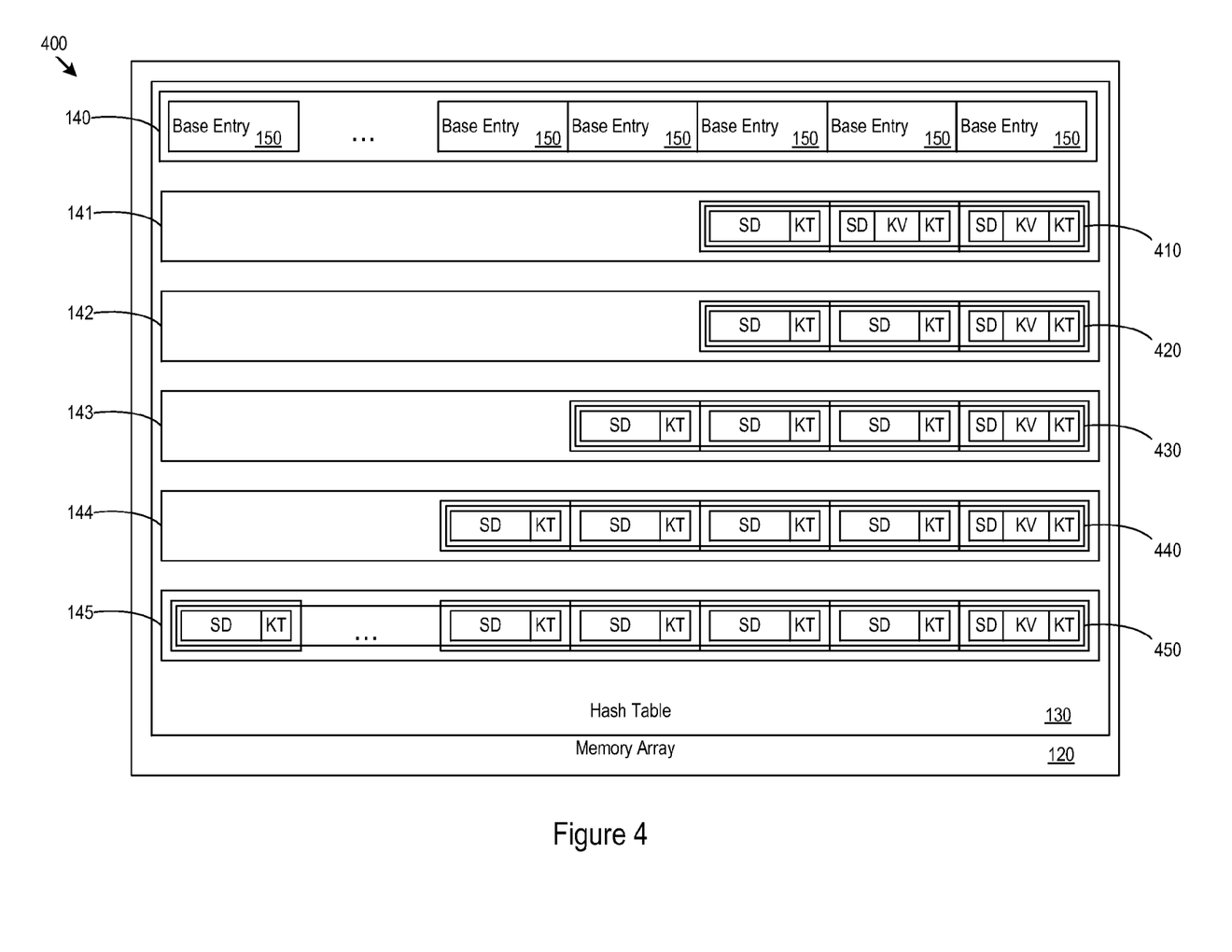
FIG. 4 illustrates a memory system supporting extended width entries.

The types of extended width entries may vary widely, as depicted in FIG. 4. FIG. 4 illustrates a memory system 400 supporting extended width entries. The memory system 400 includes a hash table 130 with multiple buckets 140-145. Each of the buckets 140-145 includes "n" number of base entries 150. The hash table 130 also contains multiple extended width entries 410, 420, 430, 440, and 450 of varying extended width types. The number of different types of extended width entries contained within a single hash table may be varied by varying the width of the subtype field 282. As an example, a subtype field width of 3 bits may support seven types of extended width entries and an additional type to identify a non-extended width entry. In FIG. 4, the subtype field may be at least 3 bits wide to support the five types extended width entries (e.g., the extended width entries 410-450) contained in the hash table 130.

The extended width entry 410 includes a flexible width entry spanning two base entries (non-extended portion) that has been extended to include one additional base entry 150 (extended portion). The extended width entries 420, 430, and 440 each include a regular entry (non-extended portion) extended to include additional base entries. The extended portions of the extended width entries 420-440 vary in length. The extended width entry 420 contains one additional base entry while the extended width entry 430 contains two additional base entries. The extended width entry 440 contains three additional base entries to store specified data. Extended width entries may be extended to contain as many additional base entries as are available in a bucket for a specific hash table implementation. For example, the bucket 145 is divided into "n" base entries. Extended width entry 450 includes a regular entry stored in a single base entry and "n−1" additional base entries to store specified data.

Figure 5:
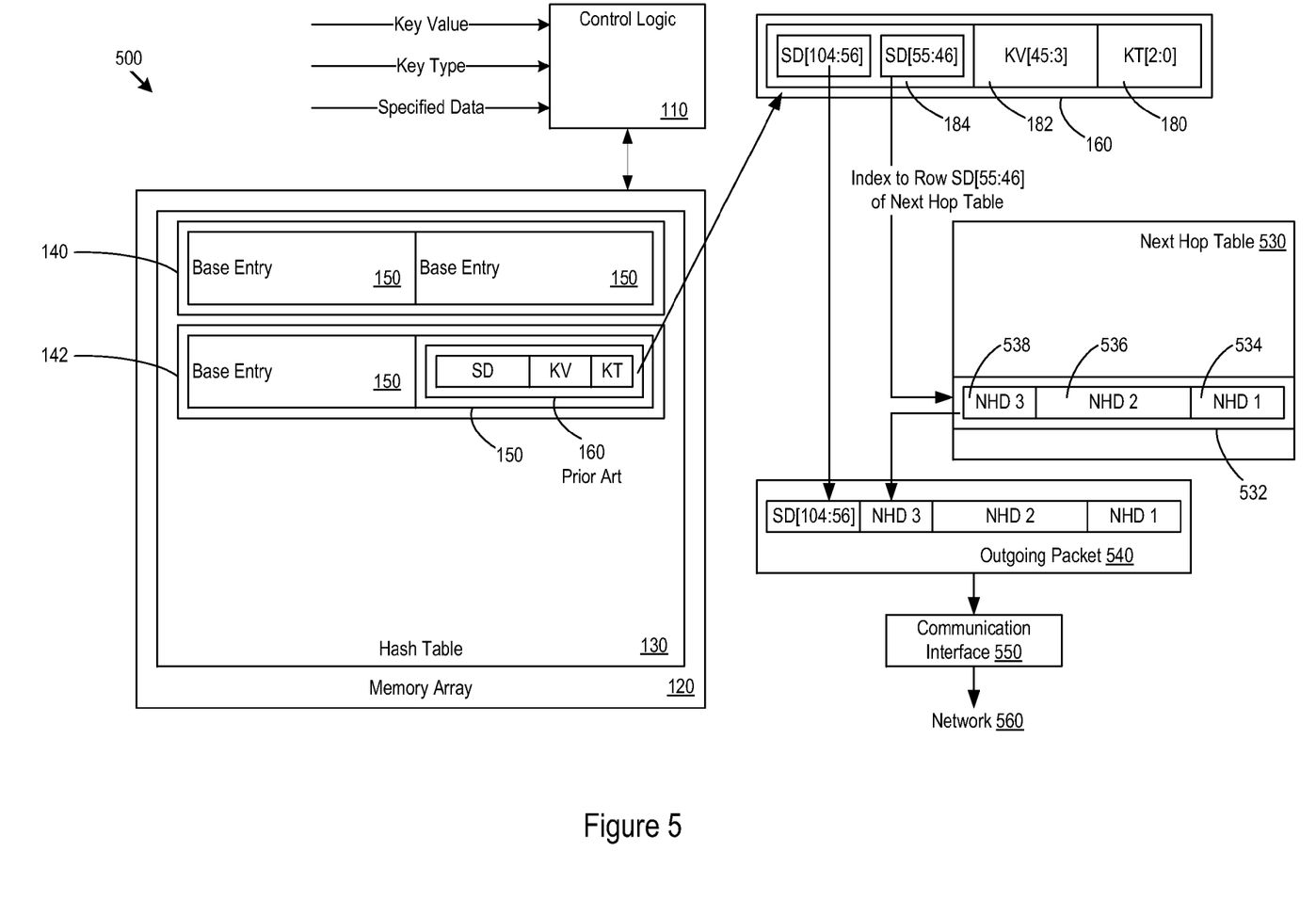
FIG. 5 illustrates a memory system.

The extended width entries provide enhanced packet routing functionality, compared with prior fixed or flexible width entries. To aid understanding, FIG. 5 first shows how the hash table supports packet routing with fixed width entries. The memory system 500 in FIG. 5 illustrates a next hop table 530, an outgoing packet 540, and a communication interface 550. The next hop table 530 includes next hop rows (e.g., the next hop row 532) that hold next hop routing information. The next hop row 532, for example, includes a first next hop data field 534, a second next hop data field 536, and a third next hop data field 538. In the example in FIG. 5, the regular entry 160 has a width of 105 bits, ranging from the least significant (bit 0) to most significant (bit 104). Further, the key type field 180 has a width of 3 bits and occupies bits 2 to 0 of the regular entry 160. The key value field 182 has a width of 43 bits and occupies bits 45 to 3 of the regular entry 160. The data field 184 has a width of 59 bits and occupies bits 104 to 46 of regular entry 160. In this example, the outgoing packet 540 includes a portion of the specified data of a regular entry 160 (e.g., bits 104 to 56 of the data field 184) as well as the next hop data from a next hop row 532.

The control logic 110 uses the key value and a key type to help construct the outgoing packet 540. To that end, the control logic 110 performs a hash table lookup operation and returns a hit on a regular entry 160. The specified data of the regular entry 160 is used to construct the outgoing packet 150. Some of the data needed for routing the outgoing packet 540 is stored in the next hop table 530. In this example, bits 55 to 46 of the specified data form a next hop index value, specifying (e.g., as a direct index) the particular row in the next hop table 530 where the remaining data for the outgoing packet 530 is stored. In FIG. 5, bits 55 to 46 of the specified data point to the next hop row 532. An additional lookup is made to the next hop table 530, and data from each of the next hop data fields 534-538 in next hop row 532 is pulled to construct the outgoing packet 540. The outgoing packet 540 may also include bits from the regular entry 160 itself, e.g., bits 104 to 54 of the specified data that were retrieved from the hash table lookup operation. Once the outgoing packet 540 is fully constructed, it may be transmitted across a network 560 through the communication interface 550.

Figure 6:
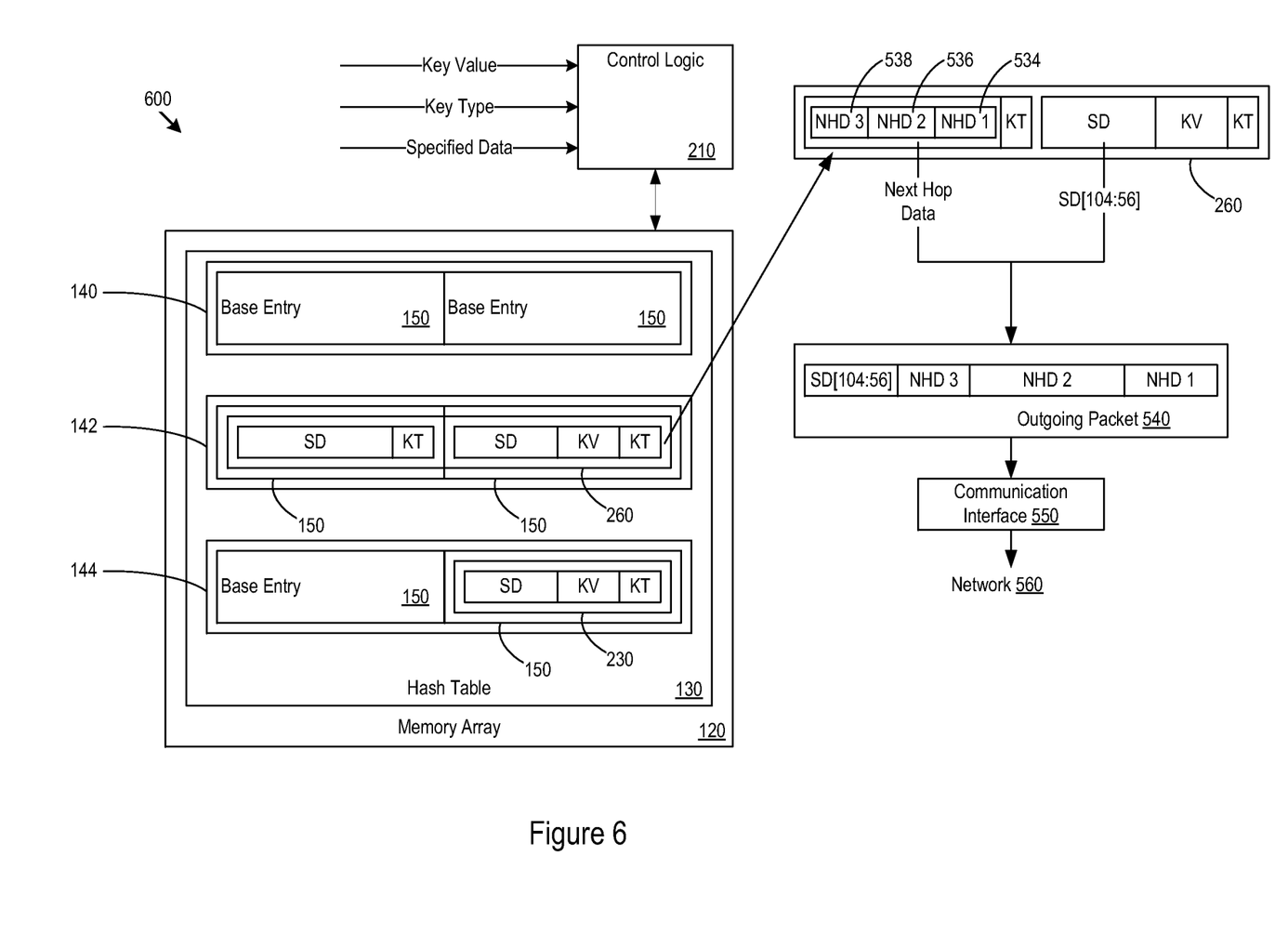
FIG. 6 illustrates a memory system supporting extended width entries.

FIG. 6 illustrates a memory system 600 supporting routing using extended width entries. In the example in FIG. 6, the hash table 130 includes a double extended width entry 260 and a regular entry 230. When the hash table search performed for a key value and a key type returns an extended width entry (e.g., the double extended width entry 260), the outgoing packet 540 may be constructed entirely from the specified data retrieved from the extended width entry. In particular, the double extended width entry 260 spans two base entries 150, storing additional specified data in the second base entry. The next hop data (e.g., next hop data fields 534-538) may be stored directly in the extended portion (e.g., the second base entry) of the double extended width entry 260, the base portion, or both. As a result, a second lookup operation into the next hop table 530 is not required because the next hop data may be obtained directly from the extended portion or other data portion of the double extended width entry 260. Any other bits for the outgoing packet 540 (e.g., bits 104 to 56 of the specified data) may be obtained directly from extended width entry as well. In other words, extended width entries provide the extra data for having outgoing packets constructed without a separate indexing operation into the next hop table 530.

During the lookup operation performed on the hash table 130, the control logic 210 may determine that a "hit" returned an extended width entry or a non-extended width entry by checking the subtype field of the returned entry. If a non-extended width entry was returned, the control logic 210 or other routing logic performs an additional lookup in the next hop table 530 using index bits from the non-extended entry. If an extended width entry was returned, the control logic 210 or other routing logic obtains the next hop data directly from the extended width entry.

As previously discussed, extended width and non-extended width entries may coexist within a single hash table 130, and a user or software application may or may not specify the ratio of each type of entry. As an example, a software application may be configured to initially insert non-extended width entries in the hash table 130, and store next hop data in the next hop table 530 until the next hop table 530 is completely filled. Once the next hop table 530 reaches capacity, the software application may instruct the control logic 210 to insert further entries as extended width entries. These extended width entries store the next hop data directly in the additional specified data fields provided by the extended portion of the entry.

Alternatively, a software application may be initially configured to store extended width entries in the hash table 130. This configuration may increase performance by avoiding additional lookups into a next hop table 530 when constructing the outgoing packet 540. When the hash table 130 reaches a certain threshold capacity (for example, 60% full), the software application may then elect to insert all further entries as non-extended width entries, in order to increase the number of total entries the hash table 130 can store in the remaining hash table space.

Figure 7:
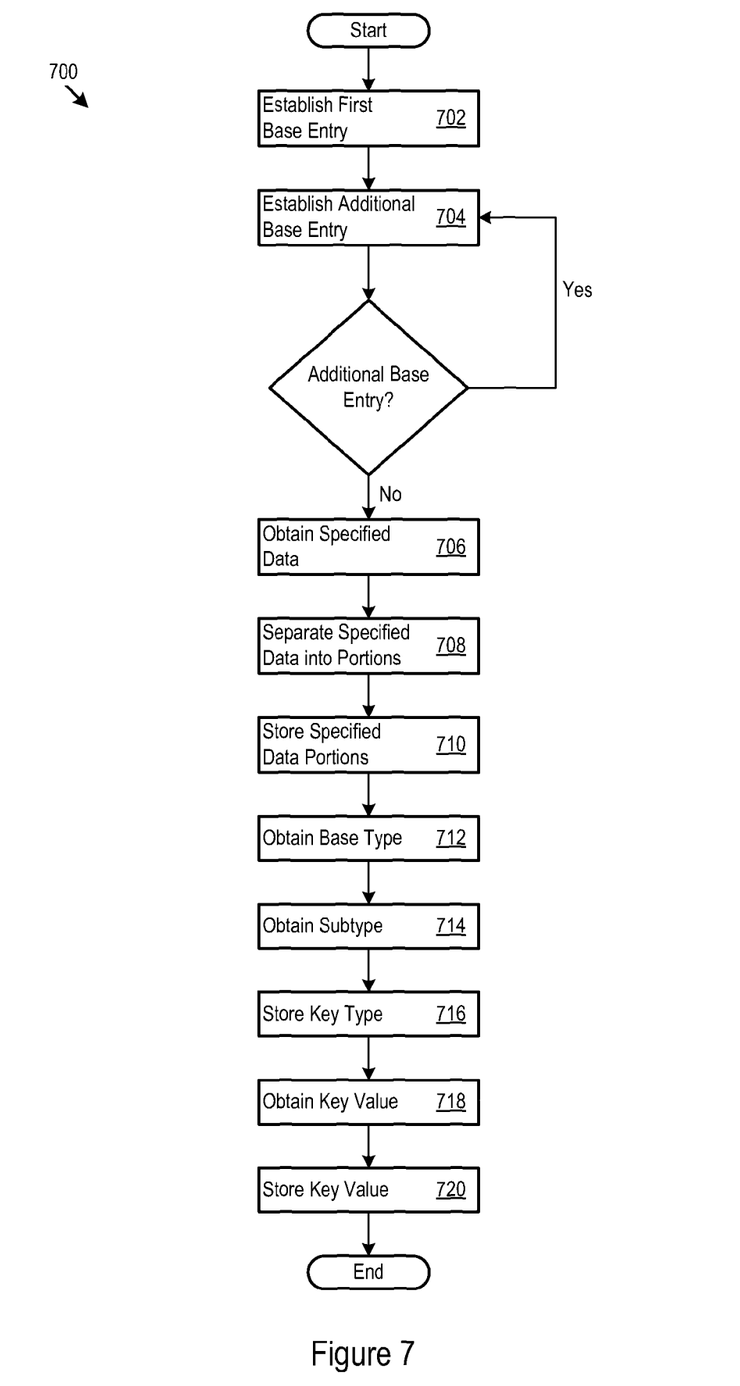
FIG. 7 illustrates a flow diagram for implementing a hash table supporting extended width entries.

FIG. 7 illustrates a flow diagram 700 for implementing a hash table supporting extended width entries. In order to extend a regular entry, a first base entry may be established (702) as the non-extended portion for subsequent extension. Alternatively, a flexible width entry may also be established as the non-extended portion of an entry for extension. Whether a regular entry spanning a single base entry or a flexible entry spanning multiple base entries is established for extension, an additional base entry is next established (704). The additional base entry may be the first base entry of the extended portion of the entry. The extended portion of an extended width entry may vary in base width length, as limited by the number of base entries 150 per bucket in a particular hash table implementation. Accordingly, additional base entries may be further established as extended base entries (704). A third base entry, a fourth base entry, or an $n^{th}$ base entry may be established (704) as part of the extended portion of the extended width entry.

Next, the specified data is obtained (706) and separated into portions (708). The width of the data fields in the non-extended portion of the entry are specified by the base type. The specified data may also be separated to occupy the data fields of the additional established base entries in the extended portion of the entry. The separated specified data portions are then stored in the respective base entry extensions (710).

The key type specifying the width of the key value may be obtained from the control logic 210. As discussed above, the key type of an extended width entry includes a base type field (712) and a subtype field (714). The key type may be stored (716) in portions of the extended width entry. The key type may be stored in all of the extended base entries, in some of the extended base entries, or in none of the extended base entries. The key type may also be stored in the first established base entry or flexible width entry. Similarly, the key value may be obtained (718) from the control logic 210 and stored (720) in portions of the extended width entry.

Figure 8:
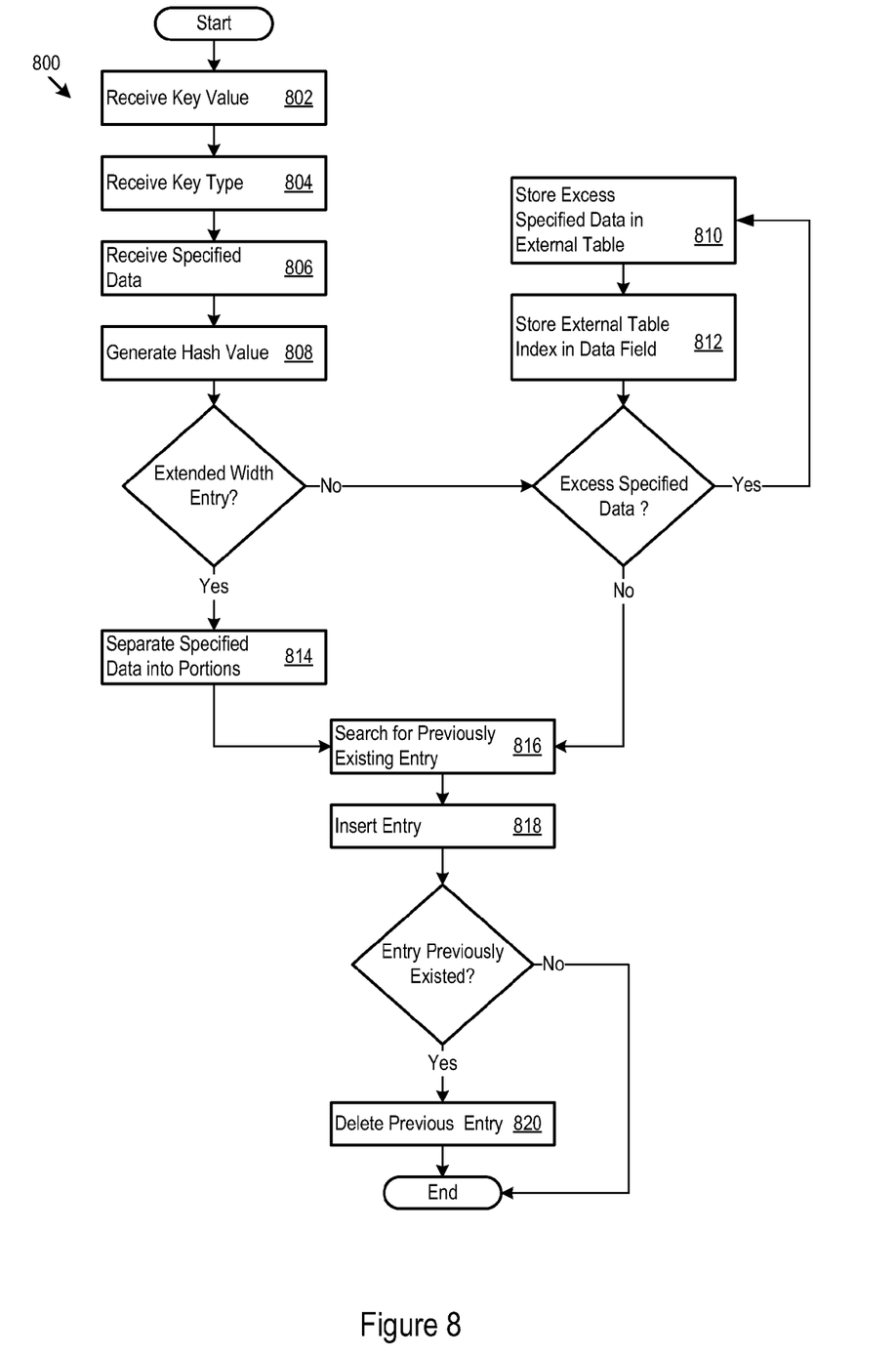
FIG. 8 illustrates a flow diagram for inserting a hash table entry into a hash table supporting extended width entries.

FIG. 8 illustrates a flow diagram 800 for inserting a hash table entry into a hash table 130 supporting extended width entries. In order to execute an insert operation, the control logic 210 may receive the key value (802), the key type (804), and the specified data (806) as inputs. A hash function may generate a hash value from the received key value (808).

The subtype field 282 of the key type may specify whether a hash table entry is or is not an extended width entry. If the hash table entry to be inserted is an extended width entry, the specified data may be separated into multiple portions according to the number of base entries the extended width entry extends into (814). The additional specified data is stored in the data fields of the non-extended portion of the entry and the additional base entries of the extended portion of the entry.

Whether the hash table entry to be inserted is an extended width entry or not, the control logic 210 may search the hash table 130 for a previously existing version of the hash table entry (816). The control logic 210 may search the particular bucket addressed by the generated hash value to match the key value and the key type of the entry to be inserted. The control logic 210 may additionally search the addressed bucket for the key value and every other subtype supported by the hash table 130. This may be done to determine if any version of the entry (extended or non-extended) exists in the hash table. Once the search for a previously existing entry (816) has completed, the hash table entry may be inserted into the hash table 130 (818).

If the search (816) determined that a previously existing entry with a matching key value and base type exists, then the insert operation may have been issued to replace the previous version of the entry. This may be done to convert an extended width entry to a non-extended width or vice versa. Accordingly, the control logic 210 may delete the previously existing entry (820) after inserting the hash table entry to complete the entry replacement. As an example, the control logic 210 may receive a double extended width entry 260 to insert into a hash table. A search for previously existing entries with the same key value and base type may determine that a regular entry 230 with matching key value and base type exists in the hash table 130. Thus, after the double extended width entry 260 is inserted into the hash table 130 (818), the control logic will perform a delete operation on the previous version of the entry, the regular entry 230 (820). By inserting the replacement hash table entry (816) before deleting the previously existing entry (818), the system may ensure that at least one version of the hash table entry exists within the hash table 130 during the entire duration of the replacement process. Had the previously existing entry been instead deleted (818) before the insertion of the replacement hash table entry (816), neither version of the entry would exist during the insertion of the replacement hash table entry. In this situation, any lookup operations for the hash table entry performed during the insertion operation may inadvertently return a hash table "miss" during the replacement process.

Figure 9:
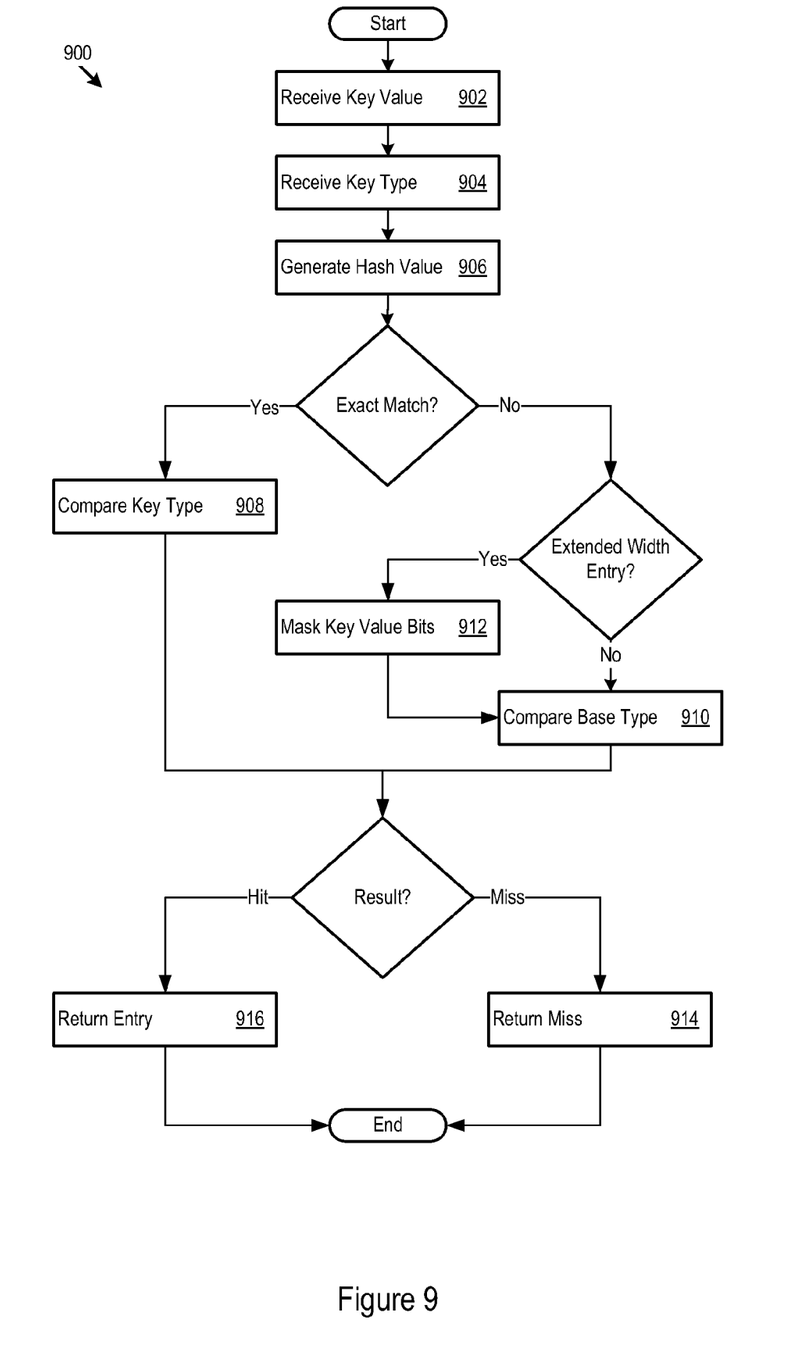
FIG. 9 illustrates a flow diagram for executing a lookup operation on a hash table supporting extended width entries.

FIG. 9 illustrates a flow diagram of logic 900 that the control logic 210 may execute to perform a lookup operation on a hash table supporting extended width entries. The control logic 210 may first receive the key value (902) and the key type (904). The key value and key type may be inputted into a hash function to generate a hash value (906) pointing to a particular hash table bucket. Because a hash table 130 supporting extended width entries may contain a mix of extended width and non-extended width entries for a particular key type, a lookup operation may match the entire key type (exact match) or only the base type field (non-exact match).

An exact lookup operation may match the entire inputted key type. Within the addressed bucket, the key value and the key type (both base type and subtype) of each base entry may be compared with the inputted key value and key type (908). For entries extended from flexible base entries, the key value of the flexible width entry may require reconstruction from the respective base entries before a proper comparison with the inputted key value can be made. See FIG. 1.

Alternatively, a non-exact lookup operation may be performed by only comparing the base type of each hash table entry in the addressed bucket. This type of lookup operation would return a "hit" regardless of the subtype of the hash table entry. Non-extended and extended width entries alike may return a "hit" if the key value and base type of an entry match the inputted values (910). Recall that in some implementations, the key value is not stored in the base entries of the extended portion of an extended width entry. However, the key type specified data, (and not the key value) may be stored in each of the base entries that the extended width entry spans across (i.e., both the non-extended portion and extended portion). Thus, specified data may appear in extended base entries at the same place that the key value appears in the first base entry for the extended width entry. As a result, false "hits" may arise if the specified data stored matches the key value. In order to avoid false hits, the control logic 210 may recognize that specific entries are extended width entries (e.g., by analyzing they key type), and prevent the extended base entries from returning false hits should the key value matches the specified data (912).

The comparison of the key value and the key type (or base type only) will result in a lookup "hit" or lookup "miss". If the lookup compare matched an entry with identical key value and key type (or base type only), then the "hit" entry is returned to the control logic 210 (916). Conversely, if the comparison of key value and key type (or base type) in the addressed bucket failed to find a matching entry, a "miss" signal is returned to the control logic 210 (914).

The methods, devices, and logic described above may be implemented in many different ways in many different combinations of hardware, software or both hardware and software. All or part of the logic may be implemented as instructions for execution by a processor, controller, or other processing device and may be stored in a machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Similarly, all or part of the logic may be implemented in one or more application specific integrated circuits (ASICs), field programmable gate arrays (FPGAs), or other integrated circuits alone or in combination with other logic.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
    establishing a first base entry of a predefined base width and comprising a first data field and a subtype field, the subtype field specifying that at least one additional base entry will be combined with the first base entry to form an extended entry for storing specified data;
    establishing a second base entry of the predefined base width and comprising a second data field;
    obtaining the specified data;
    determining the specified data exceeds a data length supported by the first data field;
    storing the specified data across the first and second base entries by:
        separating the specified data into a first portion and a second portion;
        storing the first portion in the first data field;
        storing the second portion in the second data field;
        obtaining a key type value comprising a base type field value and a subtype field value, the subtype field value identifying, as the extended entry for storing the specified data, a combination of the first base entry and the second base entry; and
        storing the key type value in the first base entry; and
        storing the key type value in the second base entry, where the key type value stored in the second base entry is the same as the key type value stored in the first base entry.

2. The method of claim 1, further comprising:
    obtaining a key value; and
    storing the key value in the first base entry.

3. The method of claim 2, where storing the key value comprises:
    storing the key value in the first base entry and storing no portion of the key value in the second base entry.

4. The method of claim 1, further comprising:
    establishing a third base entry of the predefined base width and comprising a third data field; and where storing the specified data further comprises:
        separating the specified data into the first portion, second portion, and a third portion;
        storing the third portion in the third data field; and
        storing the key type value in the first base entry, the subtype field value of the key type value identifying, as an extended entry for storing the specified data, the combination of the first, second, and third base entries and no other base entry for storing the specified data.

5. The method of claim 4, further comprising:
    storing the key type value in the second and third base entries, where the key type value stored in the second and third base entries is the same as the key type value stored in the first base entry.

6. The method of claim 4, further comprising:
    establishing a fourth base entry of the predefined base width and comprising a fourth data field;
    and where storing the specified data further comprises:
        separating the specified data into the first portion, second portion, third portion, and a fourth portion;
        storing the fourth portion in the fourth data field; and
        storing the key type value in the first base entry, the subtype field value of the key type value identifying, as an extended entry for storing the specified data, the combination of the first, second, third, and fourth base entries.

7. The method of claim 6, further comprising:
    storing the key type value in the second, third, and fourth base entries, where the key type value stored in the second, third, and fourth base entries is the same as the key type value stored in the first base entry.

8. A memory system comprising:
    a memory array storing hash table entries, the entries comprising:
        a first base entry of a predefined base width and comprising a first data field and a subtype field, the subtype field specifying that at least one additional base entry will be combined with the first base entry to form an extended entry for storing specified data;
        a second base entry of the predefined base width and comprising a second data field; and
    a processor in communication with the memory array; and
    write logic that, when executed by the processor, is operable to:
        obtain the specified data;
        determine that the specified data exceeds a data length supported by the first data field; and
        store the specified data across the first and second base entries by:
            separating the specified data into a first portion and a second portion;
            storing the first portion in the first data field;
            storing the second portion in the second data field;
            obtaining a key type value comprising a base type field value and a subtype field value, the subtype field value identifying, as the extended entry for storing the specified data, a combination of the first base entry and the second base entry; and
            storing the key type value in the first base entry; and
            store the key type value in the second base entry, where the key type value stored in the second base entry is the same as the key type value stored in the first base entry.

9. The memory system of claim 8, where the write logic is further operable to:
    obtain a key value; and
    store the key value in the first base entry.

10. The memory system of claim 9, where the write logic is operable to:
    store the key value in the first base entry and store no portion of the key value in the second base entry.

11. The memory system of claim 8, where the memory array further comprises:
    a third base entry of the predefined base width and comprising a third data field; and where the write logic is further operable to:
        separate the specified data into the first portion, second portion, and a third portion;
        store the third portion in the third data field; and
        store the key type value in the first base entry, the subtype field value of the key type value identifying, as an extended entry for storing the specified data, the combination of the first, second, and third base entries and no other base entry for storing the specified data.

12. The memory system of claim 11, where the write logic is further operable to:

store the key type in the second and third base entries, where the key type value stored in the second and third base entries is the same as the key type value stored in the first base entry.

13. The memory system of claim 11, where the memory array further comprises:
a fourth base entry of the predefined base width and comprising a fourth data field;
and where the write logic is further operable to:
separate the specified data into the first portion, second portion, third portion, and a fourth portion;
store the fourth portion in the fourth data field; and
store the key type value in the first base entry, the subtype field value of the key type value identifying, as an extended entry for storing the specified data, the combination of the first, second, third, and fourth base entries.

14. The memory system of claim 13, where the write logic is further operable to:
store the key type in the second, third, and fourth base entries, where the key type value stored in the second, third, and fourth base entries is the same as the key type value stored in the first base entry.

15. A memory system comprising:
a memory array storing hash table entries, the entries comprising:
a first base entry of a predefined base width, the first base entry comprising a first data field and a subtype field, the subtype field specifying that at least one additional base entry will be combined with the first base entry to form an extended entry for storing specified data;
a second base entry of the predefined base width; and
a third base entry of the predefined base width; and
a processor in communication with the memory array; and
write logic that, when executed by the processor, is operable to:
obtain the specified data;
determine that the specified data exceeds a data length supported by the first data field;
obtain a key value; and
store the specified data and the key value across multiple base entries by:
separating the specified data into a first data portion, a second data portion, and a third data portion;
separating the key value into a first key portion and a second key portion;
obtaining a key type value comprising:
a base type field value identifying, as a flexible width entry for storing the key value, a combination of the first base entry and the second base entry; and
a subtype field value identifying, as the extended entry for storing the specified data, the combination of the flexible width entry and the third base entry;
storing the first data portion in the first base entry;
storing the second data portion in the second base entry;
storing the third data portion in the third base entry;
storing the first key portion in the first base entry;
storing the second key portion in the second base entry; and
storing no portion of the key value in the third base entry; and
storing the key type value in the first and second base entries.

16. The memory system of claim 15, further comprising:
a fourth base entry of the predefined base width; and
where the write logic is further operable to:
separate the specified data into the first data portion, second data portion, third data portion, and a fourth data portion;
store the fourth data portion in the fourth base entry; and
where:
the subtype field value identifies, as an extended entry for storing the specified data, the combination of the flexible width entry and the third and fourth base entries, and no other base entry for storing the specified data.

17. The memory system of claim 15, where the write logic is further operable to:
store the key type value in the third base entry, where the key type value stored in the third base entry is the same as the key type value stored in the first and second base entries.

* * * * *